United States Patent
Castle et al.

(10) Patent No.: US 7,156,579 B2
(45) Date of Patent: Jan. 2, 2007

(54) MANUFACTURED CAVERNS IN CARBONATE ROCK

(75) Inventors: James W. Castle, Clemson, SC (US); David A. Bruce, Clemson, SC (US); Ronald W. Falta, Seneca, SC (US); Lawrence C. Murdoch, Clemson, SC (US)

(73) Assignee: Clemson University, Anderson, SC (US)

( * ) Notice: Subject to any disclaimer, the term of this patent is extended or adjusted under 35 U.S.C. 154(b) by 0 days.

(21) Appl. No.: 11/219,344

(22) Filed: Sep. 2, 2005

(65) Prior Publication Data

US 2006/0045626 A1 Mar. 2, 2006

Related U.S. Application Data

(60) Provisional application No. 60/606,636, filed on Sep. 2, 2004.

(51) Int. Cl.
*B65G 5/00* (2006.01)
(52) U.S. Cl. .................... 405/58; 405/57; 405/55; 405/53
(58) Field of Classification Search ............. 405/53–58
See application file for complete search history.

(56) References Cited

U.S. PATENT DOCUMENTS

| | | | |
|---|---|---|---|
| 4,076,078 A * | 2/1978 | Drinkard et al. ............ 166/271 |
| 4,109,471 A * | 8/1978 | Sebald et al. ................. 405/57 |
| 4,577,999 A * | 3/1986 | Lindorfer et al. ............. 405/53 |
| 4,997,582 A | 3/1991 | Clark, Jr. et al. | |
| 5,669,734 A | 9/1997 | Becnel, Jr. et al. | |
| 5,842,519 A * | 12/1998 | Sydansk ..................... 166/295 |
| 6,581,618 B1 | 6/2003 | Hill et al. | |

OTHER PUBLICATIONS

Paper—*Design and Feasibility of Creating Gas-Storage Caverns by Using Acid to Dissolve Carbonate Rock Formations*, Castle et al., Presented at the 2004 SPE Regional Meeting, Sep. 15-17, 2004, 10 pages.
Paper—*Types and Uses of Underground Storage*, 6 pages, www.ci.milton.fl.us.

* cited by examiner

*Primary Examiner*—Frederick L. Lagman
(74) *Attorney, Agent, or Firm*—Dority & Manning, P.A.

(57) ABSTRACT

Disclosed is a process for manufacturing underground caverns suitable in one embodiment for storage of large volumes of gaseous or liquid materials. The method is an acid dissolution process that can be utilized to form caverns in carbonate rock formations. The caverns can be used to store large quantities of materials near transportation facilities or destination markets. The caverns can be used for storage of materials including fossil fuels, such as natural gas, refined products formed from fossil fuels, or waste materials, such as hazardous waste materials. The caverns can also be utilized for applications involving human access such as recreation or research. The method can also be utilized to form calcium chloride as a by-product of the cavern formation process.

35 Claims, 4 Drawing Sheets

2A

2B

MANUFACTURED CAVERNS IN CARBONATE ROCK

CROSS REFERENCE TO RELATED APPLICATION

This application claims benefit of U.S. Provisional Application Ser. No. 60/606,636 filed Sep. 2, 2004.

FEDERALLY SPONSORED RESEARCH AND DEVELOPMENT

The United States Government may have rights in this invention pursuant to Department of Energy Cooperative Agreement DE-FC26-02NT41299.

BACKGROUND OF THE INVENTION

The safe and efficient storage of large volumes of liquids and gases has often proven problematic, particularly for liquids and gases that can present a danger to the public or the environment due to flammability, toxicity, or the like. Safe, large volume storage that is also easily and economically accessible is even more problematic. Adding to these problems, the need for such storage is expected to increase with increasing population concentrations. For instance, when considering fossil fuels, many major markets are expected to experience shortfalls in material deliverability in the future due to increases in material demand and insufficient storage capacity, in particular during times of peak demand for fuels, e.g., summer heat waves or cold winters.

Existing large volume liquid and gas storage technologies include both above and below-ground storage. Underground storage includes, for instance, converted oil and gas fields, aquifers, and abandoned mines. Formation of subterranean caverns within existing salt formations has also been utilized to develop large volume underground storage.

Current storage schemes present both economic and safety considerations. For example, the construction of a large number of above ground fuel storage vessels introduces considerable risk in the modern era of terrorism. In addition, and when considering natural gas storage in particular, one storage scheme includes an expensive liquefication process followed by storage in insulated tanks that are expensive to construct and maintain. Moreover, it can be problematic to find locations near major markets where communities will allow the construction and maintenance of large above-ground storage facilities due to safety and aesthetic concerns.

Current underground storage technologies present difficulties as well. For example, the conversion of gas fields, oil fields and aquifers to underground storage facilities as well as the formation of salt caverns all suffer from the fact that suitable locations are often not near existing transportation facilities or market centers. Additionally, converted pre-existing facilities may not be suitable for storing certain materials because of the many containment issues associated with the high permeability of the existing formations. Manufactured salt caverns, while allowing higher deliverability rates as well as having improved impermeability over other types of underground storage, have experienced problems due to the tendency of the salt to flow under high temperature and/or pressure conditions, which can lead to cavern closure in certain situations.

What is needed in the art is technology that can provide underground locations suitable for many desirable uses, and particularly for storage of large volumes of liquid and/or gas. Moreover, what is needed in the art are methods for storing large quantities of fluids in locations not previously considered suitable for underground storage.

SUMMARY OF THE INVENTION

In one embodiment, the present invention is directed to a method for manufacturing an underground cavern. In general, the method includes drilling a well into a subterranean formation including carbonate rock, pumping a low viscosity aqueous acid solution through the well to the carbonate rock of the formation, reacting the acid with the carbonate rock, and removing the reaction products from the site.

The acid used in the process can be any suitable acid. For instance, in one embodiment, the acid can be an inorganic acid. In one particular embodiment, the acid can be hydrochloric acid. In this embodiment, the reaction products can include calcium chloride, which can be isolated and collected as a useful by-product of the formation process, if desired.

Carbonic acid formed during the reaction will be in equilibrium with carbon dioxide. At some temperatures and pressures of the formation process, the carbon dioxide can be supercritical. In one embodiment, the supercritical carbon dioxide can be utilized to control the shape and orientation of the developing cavern. In particular, a volume of the supercritical carbon dioxide can be maintained in the developing cavern, which can help to control the direction of the acid dissolution process and the final shape of the manufactured cavern.

In one embodiment, a two well design can be used to form the caverns. For instance, aqueous acid can be injected into one well and the aqueous products can be removed from a second well. In another embodiment, the acid solution can be simultaneously injected into multiple wells.

The formation process can also include methods for treating the reaction products removed from the developing wells. For instance, in one embodiment, at least a portion of the materials removed from the developing cavern (for example, that portion remaining following recovery of calcium chloride) can be conveyed to a constructed wetlands area for treatment.

The manufactured caverns formed according to the disclosed methods can be formed at any desired, predetermined depth and to any desired internal volume. For instance, in those embodiments in which direct access by people is envisioned, the caverns can be at relatively shallow depths, for instance less than about 200 feet. In other embodiments, the caverns can be deeper, for instance at depths up to about 9000 feet, for instance, between about 1000 feet and about 9000 feet. Similarly, the internal volume of the caverns can be predetermined as desired. For instance, in one embodiment, the caverns can define an internal volume greater than about 1 million cubic feet, for instance, between about 1 million cubic feet and about 8 million cubic feet.

The manufactured caverns can be used in one particular embodiment as underground storage facilities for fluids. For instance, the caverns can be used to store natural gas, hazardous wastes, petroleum, or compressed gases, just to name a few possible materials.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

DETAILED DESCRIPTION

Figure 1:
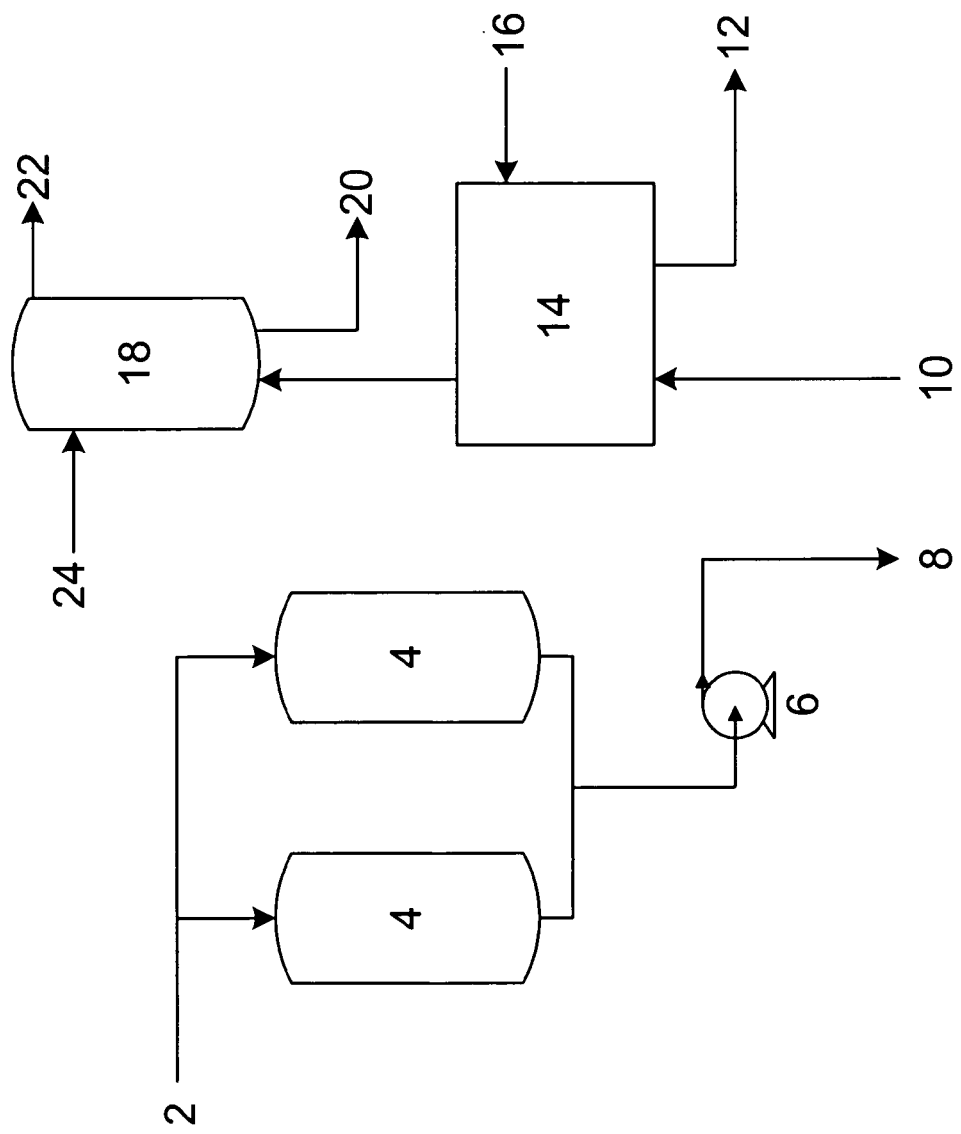
FIG. 1 is a process flow diagram for surface handling of fluids used and produced in one embodiment of the cavern formation process of the present invention.

Reference will now be made in detail to various embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents.

The present invention is generally directed to methods for forming and utilizing novel manufactured underground caverns. In particular, the disclosed caverns can be formed via acid dissolution of carbonate rock formations. Beneficially, there exist abundant carbonate rock formations worldwide that can be utilized in the disclosed process. As such, the disclosed methods can be used in one embodiment to form underground storage facilities in convenient locations, for instance near transportation facilities or existing markets and/or in areas where current storage capacity is expected to be insufficient to meet future demand. In particular, the disclosed caverns can be formed to predetermined configuration specifications so as to be better suited for any of a variety of possible applications.

Carbonate rock is fairly abundant, making up between about 10% and about 15% of all sedimentary rock. It is generally classified as either limestone, composed mostly of calcite ($CaCO_3$) or high magnesium calcite [$(Ca,Mg)CO_3$], or the slightly less common dolostone which is composed primarily of dolomite [$CaMg(CO_3)_2$]. While the present discussion is generally directed toward the manufacture of caverns in limestone formations, it should be understood that the described process is equally applicable to the manufacture of caverns in dolomite formations.

In general, the presently disclosed processes can be utilized to form underground caverns in pure to nearly pure carbonate rock or in carbonate rock containing insoluble impurities. For purposes of this disclosure, the term 'insoluble impurities' is herein defined to refer to materials found in a carbonate rock that are insoluble in water and/or acid. For example, in one embodiment, the presently disclosed processes can be utilized to form a manufactured cavern in carbonate rock containing as much as about 30% insoluble impurities. In another embodiment, the disclosed manufactured caverns can be formed in carbonate rock containing about 10% insoluble impurities.

While not wishing to be bound by any particular theory, in some embodiments, it may prove that an amount of insoluble impurities in the carbonate formation can provide certain benefits to the manufactured caverns. For instance, insoluble impurities in the carbonate formation can include non-carbonate formations (e.g., siliciclastic) that can remain following the acid dissolution process, and these materials can help to seal the walls of the formed caverns.

Depending upon the intended use of the manufactured cavern, certain formations may be preferable to others. Criteria for examination when selecting particular formations for a particular application can include but are not limited to, level of impurities, permeability, porosity, and natural fracturing of the limestone, among others. For instance, many limestone formations are highly permeable. High permeability of the formation may be a potentially undesirable property for applications encompassing fluid storage due to the possibility of leakage of the stored materials from the facility. However, in other embodiments a large amount of formation permeability may be acceptable. Similarly, the presence of some porosity in the formation may be beneficial in some embodiments, for instance a smaller amount of acid may be needed to dissolve the carbonate rock. In one embodiment, limestone formations suitable for the disclosed process can have a porosity as high as about 30%, though any absolute maximum value could also depend upon the seal of the formation and the existence of natural fractures, in addition to the intended use of the cavern.

Natural fractures in the rock formation may not be desirable when manufacturing certain types of caverns, for instance certain types of storage facilities, due to of the possibility of leakage of stored materials from the cavern during use, but may be of little or no consequence in other applications, for instance in forming artificial caves intended for human access or to house instrumentation.

Suitable carbonate formations for the disclosed caverns can be at any depth and surrounded by any other type of formation, though preferred depths can also depend upon final use of the cavern, as discussed further below. The overlying formation can be any suitable rock, for instance carbonate or other rock of sufficient mechanical integrity to maintain the cavern. In general, stability of the manufactured caverns depends on various factors, including for instance the rock type, depth, state of stress, shape of the cavern, fluid pressures within the cavern, and formation.

According to the presently disclosed process, a carbonate rock formation can be at least partially dissolved via reaction with an aqueous acid. For instance, when considering a limestone formation, the primary reaction of the formation process can be described by:

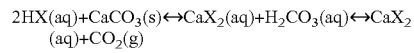

It should be noted that in many embodiments of the invention, due to the expected temperatures and pressures at which the cavern formation processes can take place, the carbon dioxide produced by the reaction can be in the supercritical phase, certain benefits of which are discussed further below.

There are many aqueous acids, both organic and inorganic, suitable for use in the formation process either alone or in a mixture. For example, a non-limiting exemplary list of possible acids can include orthophosphoric acid, sulfuric acid, hydrochloric acid, nitric acid, formic acid, acetic acid, 3-hydroxypropionic acid, citric acid, hydrobromic acid, or mixtures of aqueous acids. The preferred acid for any particular embodiment can vary, however, and can depend upon a combination of factors including but not limited to:

acid cost and availability;
aqueous solubility of resulting calcium salts;
acid and/or salt toxicity;
waste remediation considerations;
corrosion characteristics;
the need for combustion and/or evaporation controls (particular to the case of organic acids);
dissolution reaction rate;
dissolution reaction equilibrium constant;
pKa for acid dissociation in water;
prior use in related oil and gas applications; and
value of the resulting salts.

In order to dissolve large deposits of carbonate rock with one or more aqueous acids and successfully form the desired caverns, the kinetics and the equilibria of the specific reactions involved must be taken into consideration. In fact, these factors can be the primary factors to be used in determining the preferred acid in a particular process. Due to the relatively common nature of many of the possible reagents involved in the disclosed dissolution process, however, much of the reaction kinetics, reaction equilibria, and reactant/product solubility data have already been quantified and are readily available and generally known in the art.

In one preferred embodiment, an acid can be chosen such that the reaction rate is fast and the reaction equilibria favor the formation of highly soluble salt products. Accordingly, and as the reaction products can be removed fairly easily from the reaction site, the primary parameter determining the rate of cavern formation can be the rate at which the acid solution is provided to the subterranean formation.

Reaction equilibria for the particular dissolution reactions involved can determine the thermodynamic limit to which reactants can be converted into products and can be calculated using the Gibbs free energy of formation for the reagents and products. Additionally, the change in enthalpy (heat generation) with reaction can be calculated from similar pure components properties. These data and the relevant equations relating them are shown below in Table 1 for exemplary reactions. As can be seen, in these particular reactions the equilibrium reaction constant is high (favorable) for all of the listed acids except acetic acid. Further, all of the dissolution reactions are exothermic. Exothermic reactions may be preferred in some embodiments, as localized heating effects could increase the rate of the carbonate rock dissolution.

TABLE 1

| Reaction | $\Delta G$ (kJ/mol) | $\Delta H$ (kJ/mol) | $^{298}K_{eq}$ |
|---|---|---|---|
| $MgCa(CO_3)_2$ (s) + 4HCl (aq) ↔ $MgCl_2$(aq) + $CaCl_2$ (aq) + $2H_2CO_3$ (aq) | −90.9 | −82.6 | $8.48 \cdot 10^{15}$ |
| $CaCO_3$ (s) + $H_2SO_4$ (aq) ↔ $CaSO_4$ (s) + $H_2CO_3$ (aq) | −58.8 | −8.7 | $2.02 \cdot 10^{10}$ |
| $CaCO_3$ (s) + 2HCl (aq) ↔ $CaCl_2$(aq) + $H_2CO_3$ (aq) | −47.9 | −35.5 | $2.46 \cdot 10^8$ |
| $CaCO_3$ (s) + $2HNO_3$(aq) ↔ $Ca(NO_3)_2$(aq) + $H_2CO_3$ (aq) | −47.8 | −104. | $2.45 \cdot 10^8$ |
| $CaCO_3$ (s) + $2CH_3COOH$ ↔ $Ca(CH_3COO)$ (aq) + $H_2CO_3$ (aq) | −6.79 | −38.6 | 15.5 |

When considering a limestone dissolution process and formation of the calcium salt product, a low calcium salt solubility would require greater quantities of water (and acid) to be pumped through the underground formation in order to prevent the salt product from precipitating out of solution. Exemplary aqueous solubility data for selected limestone acid salts are shown in Table 2 below.

TABLE 2

| Acid | Calcium Salt | Solubility of Calcium Salts in Cold Water (g/l) |
|---|---|---|
| hydrobromic acid (HBr) | calcium bromide ($CaBr_2$) | 1420 |
| nitric acid ($HNO_3$) | calcium nitrate ($Ca(NO_3)_2$) | 1212 |
| 3-hydroxypropionic acid ($C_3H_6O_3$) | calcium hydroxypropionate ($Ca(C_3H_6O_3)_2$) | 1000 |
| hydrochloric (HCl) | calcium chloride ($CaCl_2$) | 745 |
| acetic acid ($CH_3COOH$) | calcium acetate ($Ca(C_2H_3O_2)_2$) | 374 |
| formic acid (HCOOH) | calcium formate ($Ca(CHO_2)_2$) | 162 |
| orthophosphoric acid ($H_3PO_4$) | calcium orthophosphate ($Ca(H_2PO_4)_2 \cdot H_2O$) | 18 |
| sulfuric acid ($H_2SO_4$) | calcium sulfate (anhydrite, $CaSO_4$) | 2 |
| citric acid ($C_6H_8O_7$) | calcium citrate ($Ca_3(C_6H_5O_7)_2 \cdot 4H_2O$) | 1 |

As can be seen, the solubility data show that most of the monoprotic inorganic acids (e.g., hydrochloric, hydrobromic, nitric) yield calcium salts with high aqueous solubility, with the exception of orthophosphoric acid. In contrast, the calcium salts of the diprotic (e.g., sulfuric acid) and triprotic (e.g., citric acid) acids have a very low solubility in water. Finally, the monoprotic organic acids react to form calcium salts that have moderate (e.g., calcium acetate, calcium formate) to high (e.g., calcium hydroxypropionate) solubility in water. In fact, the aqueous solubility of calcium hydroxypropionate is higher than that observed for calcium chloride. Accordingly, the solubility of the calcium salts derived from reactions involving sulfuric, orthophosphoric, and citric acid may not be preferred in certain embodiments of the present invention when considering just the calcium salt solubility. In one embodiment, the cavern formation process can be directed to a reactant acid yielding a calcium salt reaction product with aqueous solubility greater than about 100 g/l.

In one particular embodiment of the present invention, hydrochloric acid can be utilized. Some of the advantages in using hydrochloric acid include: comparatively low cost, high acid solubility, fast reaction rates with carbonate rock, and reaction products (e.g., calcium chloride) that are highly soluble so they can be removed from the reaction site in solution. Furthermore, the high production of hydrochloric acid (approximately 4 million metric tons per year in the United States) can be advantageous given the large quantities of acid needed to generate large caverns. However, hydrochloric acid can be corrosive to drilling equipment and the resulting waste products can require a relatively large amount of post-removal processing. As such, other, less corrosive acids may be preferred in other embodiments.

In another embodiment, the disclosed process can utilize organic acids such as acetic acid and/or formic acid. Both of these organic acids are highly miscible with water, have low viscosities, are environmentally friendly as compared to, e.g., hydrochloric acid, and are relatively non-corrosive to equipment. However, acetic and formic acid can have moderate reaction rates with carbonates (due to the low pKa of the acids in water), can form slightly less soluble calcium salt products, as previously mentioned, and currently have moderately high costs.

In another embodiment, 3-hydroxypropionic acid can be utilized in the dissolution reaction. This organic acid is produced from corn via fermentation, is fairly biodegradable, and can yield calcium salts that are highly soluble in water (even greater solubility than calcium chloride, in some embodiments); however, the cost of this acid may have a negative impact when examining the preferred acid for any particular embodiment.

When forming the manufactured caverns of the invention, a combination of known technologies for drilling wells, storing and pumping acids, and treating aqueous waste streams, among others, can be utilized. For instance, in one embodiment, the formation process of the present invention can be a fracture and acid dissolution method in which a well can be drilled to the desired depth in a suitable carbonate rock formation according to any suitable known drilling method, the carbonate rock layer can be fractured, and the cavern can then be formed using any suitable aqueous acid to dissolve the carbonate rock. In other embodiments, however, the process need not include any induced fracturing of the formation prior to the acid dissolution of the rock.

One exemplary method for handling fluids associated with the process of the present invention is shown in FIG. 1. According to this embodiment, an acid solution can be pumped via a pumping station 6 from one or more acid collection 2 and storage facilities 4 to one or more wells, as at 8, leading to a subterranean carbonate formation.

In order to facilitate the formation process, the acid solution to be utilized can generally be a low viscosity solution. For instance, in one particular embodiment of the invention the acid solution can include only water and one or more acids. In other embodiments, additional materials suitable to the process may be included, for instance, the flow can also include a sealant and/or a proppant in addition to the water and the acid. In one embodiment, the acid solution can have a viscosity of less than about 5 centipoise (cp), or lower yet in other embodiments, for instance less than about 2 cp.

The strength of the acid solution can vary over a wide range depending upon the desired formation process characteristics as well as the particular acid or mixture of acids to be utilized. For example, in certain embodiments, such as when utilizing an acid for which the dissolution reaction describes a low equilibrium constant, when the reaction products are highly soluble, and/or when a very high rate of product formation is desired, a highly concentrated acid solution can be utilized, while in other embodiments, lower concentration solutions may be preferred. For instance, when considering a hydrochloric acid solution, a solution strength of up to about 35 wt % can be used. When considering other acids, however, for example, acetic acid, sulfuric acid, phosphoric acid, or the like, any concentration strength from about 1 wt % to about 100 wt % can be used. For instance, about a 50 wt % acid solution can be used in one embodiment.

In some embodiments, it may be preferred to utilize an acid solution with a relatively low acid concentration, for instance to control the rate and/or phase of product formation, as discussed further below. According to such embodiments, the acid concentration can be, for instance, less than about 10% by weight of the solution, or less yet in other embodiments, for instance less than about 6% by weight, or less than about 3% by weight of the solution in other embodiments.

Beneficially, the disclosed process can be utilized to form caverns with predetermined shapes and/or orientations. The preferred shape and orientation of the formed caverns in any particular embodiment can vary depending upon a wide variety of parameters including, but not limited to, expected cavern use, acceptable level of leakage of stored materials (in those embodiments in which the cavern can be used as an underground storage facility), particular characteristics of the surrounding formations (e.g., strength characteristics, porosity, permeability, etc.), acceptable levels of spalling during formation and/or use, and the like. In any case, however, the cavern can be manufactured with a shape, size, and orientation such that the pressures at the cavern wall, both local and global wall pressures, can be within an acceptable range suitable for the surrounding formations so as to limit the possibility of deformation and failure of the cavern not only during the manufacturing process but over the life of the manufactured cavern.

There are several methods that can be utilized to control the shape and orientation of the caverns formed according to the disclosed methods. For instance, the number, relative location, and trajectory (i.e., well deviation direction and angle) of individual wells used during the formation process, the acid solution injection parameters, and the reaction product removal parameters can all affect not only the size of the manufactured caverns, but also the overall shape and orientation of the caverns.

Figure 2:
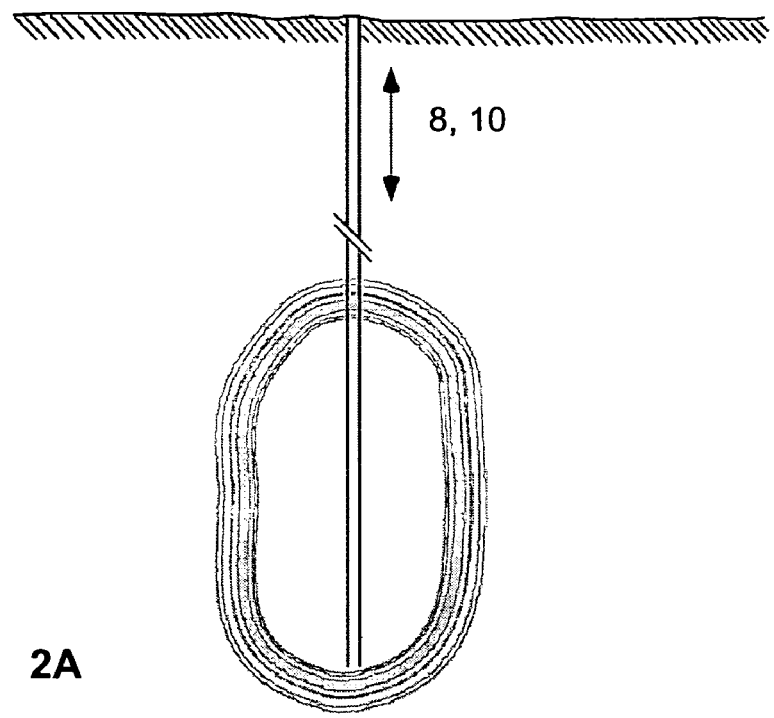
FIGS. 2A and 2B schematically illustrate a one well design (FIG. 2A) and a two well design (FIG. 2B) according to exemplary embodiments of the present invention.
Figure 2:
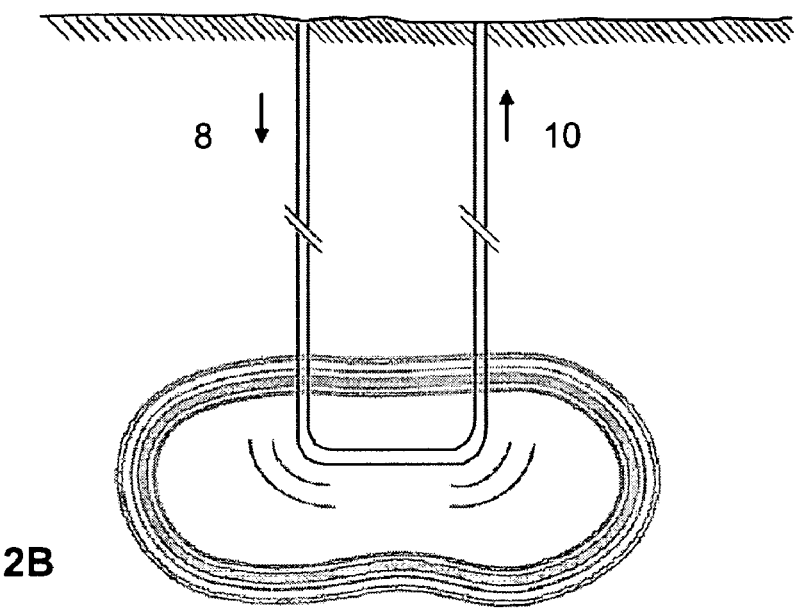

According to one embodiment, illustrated in FIG. 2A, a single well utilizing a concentric tube design can be utilized in forming the caverns. For example, the acid solution can be pumped down the single well between casings, similar to known methods for forming caverns in salt formations, and the reaction products can be removed from the well using additional casings, e.g., inner casings for the liquid products and outer casings for the gaseous or supercritical products. This design can be used in one embodiment to form a cavern with a relatively cylindrical shape. Other single well designs can also be used.

For instance, in another embodiment, a single well design can be used, as illustrated in FIG. 2A, but the formation can be fractured prior to the acid dissolution reaction. One or more preformed fractures can be used to direct flow during formation and hence the direction of growth of the cavern during the formation process.

Optionally, the caverns can be formed utilizing one or more wells that can be other than vertical in design. For instance, the well trajectory can be other than vertical throughout the well length or optionally the trajectory of a single well can vary from vertical at various points along the length of the well. For example, in one embodiment, one or more legs of the wellbore can extend at a predetermined angle from a vertical length of the well. According to this embodiment, a cavern could be formed having an overall orientation that is at an angle to vertical as compared to, for example, the generally vertical wells shown in FIG. 2. When considering an embodiment including multiple legs extending in several directions from the initial vertical well length, a cavern could be formed that is much wider at the base than at the top.

In another embodiment, a two-well design such as that shown in FIG. 2B can be utilized to form the disclosed manufactured caverns. As in the two-well design illustrated in the Figure, one well can be used to pump down fresh acid, while reaction products can be removed from the second well. In another embodiment, both wells can operate independently, that is, with acid delivery and product removal from each well. In another embodiment, the liquid products can be removed via one of the wells, while the gaseous or supercritical products can be removed from the other. Optionally, the formation process can utilize additional wells, in addition to the single and two-well designs shown in FIGS. 2A and 2B. Multi-well designs can be used, for instance, to form larger single caverns or optionally a series of interconnected caverns.

When considering one embodiment of a vertical fracture two-well design, the formation process can include drilling a first well, after which it may be desired to log the well (though this is not a requirement of the invention), performing microfracture and injection testing if necessary, drilling the second well, and then inducing fracture between the two wells. At least about 2% initial porosity in the carbonate rock can be preferred in certain embodiments of this particular process, though in general, porosity of the formation is not a requirement.

The acid solution injection parameters can also be designed and controlled in order to affect the final shape and size of the cavern. For instance, in one embodiment, the acid solution can be simultaneously injected at multiple locations of the casing. In another embodiment, the acid injection location can be altered during the formation process, for instance the injection point can be moved upward as cavern formation proceeds. Either of these methods could be used to, for instance, form a cavern with a relatively small diameter in a relatively short period of time.

The reaction product removal parameters can also affect the size and shape of the caverns. The location of the removal point for the liquid products can have a strong effect on the final cavern morphology. In addition to the liquid products, however, the dissolution reaction can also yield a second, nonaqueous, carbon dioxide-rich phase, which can have a density less than that of the salt-rich aqueous phase. In particular, the carbon dioxide-rich phase can be a supercritical phase, depending on depth and pressure.

One embodiment of the present invention employs the nonaqueous phase to help control the cavern dissolution process. In particular, in one embodiment, the removal rate of the supercritical carbon dioxide can be controlled so as to maintain a volume of the supercritical carbon dioxide as a cap at the roof of the developing cavern. Because the acid dissolution products ($CO_2$, $H_2O$, and $CaCl_2$) all have a lower density than limestone, the reaction has the potential to cause very large pressure changes in the subsurface. Accordingly, a low density carbon dioxide cap in the cavern can provide a cushion to lower pressure spikes that could occur during the formation process, and thus limit the possibility of cavern deformation or failure during the formation process due to pressure spikes.

In addition, the volume of the carbon dioxide cap at the top of the developing cavern can also be utilized to influence the morphology of the developing cavern. In particular, the presence of a sufficient carbon dioxide cap will limit contact between injected acid and the rock covered by the cap, in effect forcing the direction of the dissolution away from the cap, i.e., either downward or outward from the acid injection point, and limit cavern growth toward the roof of the developing cavern. Utilization and control of the volume of carbon dioxide may be beneficial, for instance in those embodiments in which the preferred cavern morphology includes relatively larger dimensions in the horizontal x- and y-directions as compared to the vertical, or z-dimension.

The volume of the carbon dioxide cap in the developing cavern can be controlled not only via the rate of carbon dioxide removal from the well, but also, if desired, through controlling the rate of formation of the super critical carbon dioxide. For example, in those embodiments including cavern formation utilizing a weak solution of a strong acid (e.g., less than about 5% by weight hydrochloric acid solution) a relatively greater amount of the formed carbon dioxide can be expected to be dissolved in the liquid phase in the developing cavern, leading to the formation of a smaller volume of supercritical carbon dioxide.

Referring again to FIG. 1, according to the formation process, the reaction products can be removed from the well(s), as at 10 and further treated. For instance product treatment can include one or more steam heated 16 product evaporators 14 for the removal of concentrated liquid or solid products, as at 12. The product treatment process can also include treatment at one or more absorption towers 18, for instance utilizing flow in 24 (e.g., water, alkaline solution, etc.) to produce an acid-free vapor flow out at 22 and then an aqueous stream containing residual acids and salts at 20. Any remaining materials can be further treated in a secondary treatment process, as at 22. Optionally, following separation of salt products and impurities from the product stream, the water and any residual acid can be recycled and recirculated back into the well.

Beneficially, in some embodiments the reaction products of the formation process can themselves provide value to the process and can be collected for secondary utilization. For instance, in those embodiments in which hydrochloric acid is the chosen reagent for the dissolution reaction, the reaction products can include calcium chloride, which can be beneficially utilized in many applications generally known to those of skill in the art. Accordingly, the initial liquid/slurry removed from the well can be sent to a multiple-effect evaporator, where water can evaporate and a concentrated solution of calcium chloride product can be isolated. The calcium chloride thus produced at 12 can then be sold in either liquid or solid form for, e.g., road deicing purposes in the northern latitudes, where it is the preferred deicing agent for roads. Accordingly, in one embodiment, the present invention is directed to a method for producing calcium chloride suitable for any of a wide variety of known uses.

Optionally, the disclosed methods can include a secondary treatment facility consisting of a constructed wetlands area. For example, a constructed wetlands area can cover between one-half and 5 acres, though the specific area of a constructed wetlands can depend upon the total amount of aqueous product expected to be removed from the formation process and treated in the wetlands, which in turn will depend on the size of the storage facility to be developed and the particular reagents to be used.

Particular plants can be located in the wetlands area that can be utilized to absorb dissolved carbon-containing anions and convert them into biomass. The biomass can then, if desired, be collected and processed to, for example, produce fuel or other suitable products or be incorporated into animal feed. In this embodiment the use of constructed wetland treatment systems may contribute to the reduction of carbon dioxide released from the dissolution process (e.g., the formation of a cavern of approximately 6 million cubic feet is estimated to produce about 234 thousand tons of carbon dioxide—approximately 6% of what a typical coal power plant releases annually). Known principles of natural wetlands can generally be applied when constructing such a treatment system in order to maximize the possibility of the desired reactions at predictable rates. For instance, the particular plants utilized in forming the wetlands area can be chosen for their resilience to moderate levels of salts, such as calcium chloride, and can be similar to those proven highly effective in applications involving the treatment of similar aqueous waste streams, such as refinery effluent and brines produced from oilfields as well as waste streams from power plant boilers and scrubbing towers.

Other treatment processes as are generally known in the art for treating the wastewater can also be utilized in the disclosed processes, either in addition to or alternative to the processes as herein described.

The disclosed manufactured caverns can conveniently be formed in carbonate formations at any desired depth. The preferred depth of any particular cavern and the particular type of access manufactured to utilize the cavern can generally depend at least in part upon the final desired use of the cavern, though the economics of forming and using the caverns can also be important in determining the preferred depth of the caverns. For example, in those embodiments in which the caverns can be expected to be accessed by people, for instance if the caverns are designed for use as artificial caves for research purposes, recreation purposes (e.g., artificially formed spelunking locations), equipment and document storage, or as underground bunkers for safety purposes, the caverns can be formed at relatively shallow depths, for instance within a few hundred feet of the surface and accessible via the installation of stairs, elevators, fabricated tunnels, or the like. In one embodiment, caverns can be formed at depths of as little as about 100 feet.

In other embodiments, it may be preferred to form deeper caverns. For instance, in those embodiments in which the caverns are intended for use as storage facilities for materials that are a gas at ambient temperatures and pressures, it may be preferable to form the caverns at greater depths so as to maximize the storage capability of the caverns as well as to ensure the safety of the storage facility. For example, in one embodiment, the storage facilities can be utilized for storing liquid or gaseous waste materials, including hazardous waste materials. Accordingly, it may be preferred in such embodiments to form the caverns at greater depths as compared to caverns that are intended to be directly accessible to people.

In other embodiments, caverns may be created in order to contain scientific experiments that are to be conducted under conditions that can only be created at depth in rock. For example, scientific experiments may be carried out in underground caverns of the invention that can be maintained at high pressure (greater than 1000 psi, for example) for extended periods of time (more than 1 year). Alternatively, some experiments involving the detection of neutrinos could be conducted in a cavern created by this invention.

According to one embodiment, the present invention can be directed to the formation of caverns in carbonate rock at depths greater than about 1000 feet, for instance at depths between about 1000 and about 7000 feet. In one embodiment, the disclosed storage facilities can be formed in limestone deposits at depths between 6000 and 9000 feet.

It should be understood, however that formation of the disclosed caverns for use as underground storage facilities at any particular depth is not a requirement of the present invention. For example, when considering the formation of underground storage facilities for essentially incompressible liquid materials, it can be preferred to form the disclosed caverns at relatively shallow depths, for instance at depths of less than about 4000 feet, or less than about 2000 feet in some embodiments.

In one embodiment, the caverns may be utilized to store energy in the form of compressed gas. For instance, compressed air could be stored in a manufactured cavern and the potential energy stored in the compressed air can be converted as desired to another form, for instance mechanical energy or electrical energy. For instance, the compressed gas (e.g., air) can be controllably released from the cavern and translated to mechanical energy at a turbine. The motion of the turbine can then be used as desired, for instance in generation of electricity, in one particular example.

Beneficially, when utilized as an underground storage facility, the manufactured caverns of the invention can exhibit greater flexibility in injection/withdrawing cycling than possible for underground storage facilities formed of porous media, e.g., converted gas fields, oil fields, or aquifers. In particular, the storage facilities of the invention can have a relatively low cushion requirement and can have an inventory turnover capability of more than once per year. For instance, it is believed that the disclosed caverns can have an inventory turnover of up to about three times per year, and even higher in other embodiments, for instance up to about 5 times per year, though the maximum turnover capability can depend upon the permeability of the enveloping formation, among other factors. In comparison, most existing gas reservoirs that have been converted to porous medium storage are designed for only annual cycle withdrawal and injection and exhibit little injection/withdrawing flexibility.

Even higher inventory turnover capability is possible in those embodiments wherein a liquid is simultaneously injected into the cavern during product removal. For instance, water can be injected simultaneously with the removal of the stored material, e.g., natural gas, so as to maintain a relatively constant pressure within the cavern during removal of the gas. Accordingly, very high rates of inventory turnover are encompassed by certain embodiments of the present invention. Optionally, the injection fluid can be collected as the cavern is again filled with inventory and recycled during subsequent inventory removal, thus providing very high inventory turnover capability with limited environmental impact.

As mentioned above, in one particular embodiment, the manufactured caverns of the invention can be formed for the purpose of storing natural gas. Natural gas is a highly compressible mixture, and the density ($\rho$) of natural gas varies significantly with changes in temperature (T) and pressure (P) and to a lesser extent with composition. The cavity storage volume (V) required for a given quantity of natural gas has been estimated in the following discussion using the gas density at STP and storage conditions. For purposes of developing the estimates, the natural gas composition was estimated to be 90% methane and 10% ethane, which yielded an average gas molecular weight of 17.3 g/mol, which corresponds to a 0.6 gravity gas (i.e., the specific gravity of the gas is 40% less than that of air at standard temperature and pressure (STP) conditions). The relationship can be described as:

$$\frac{V(STP, \text{ft}^3)}{\rho(STP, \text{lb/ft}^3)} = \frac{V(\text{storage } T \text{ and } P, \text{ft}^3)}{\rho(\text{storage } T \text{ and } P, \text{lb/ft}^3)}$$

Figure 3:
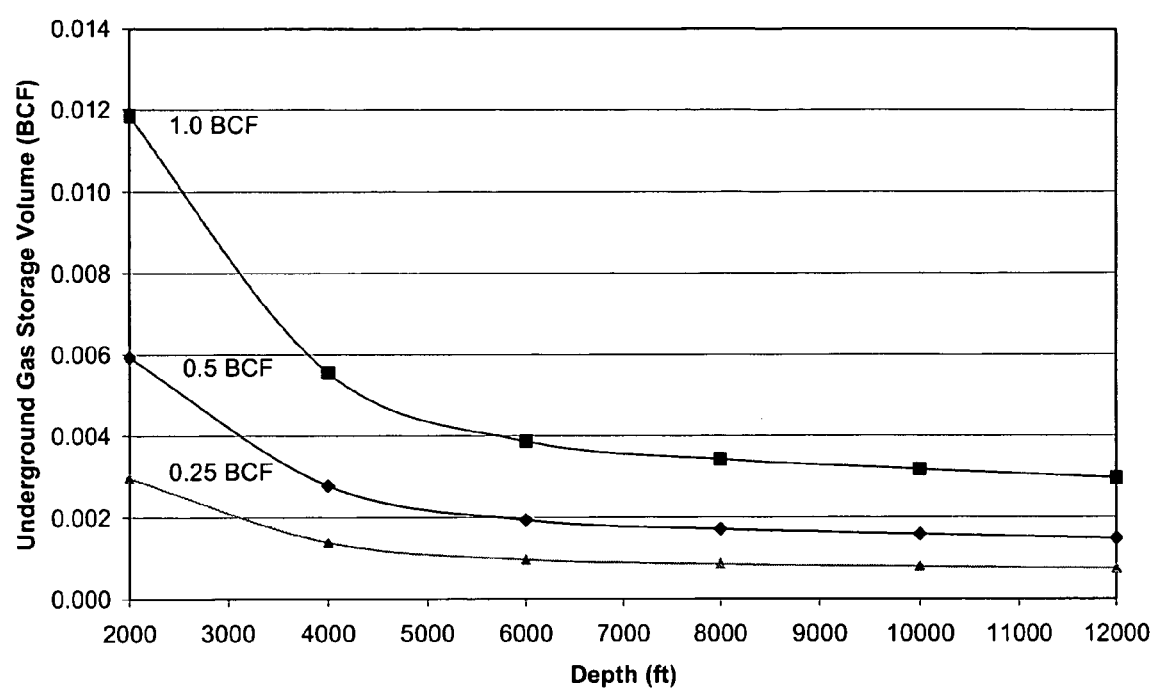
FIG. 3 graphically illustrates the estimated variation of cavern volume requirements with depth for storing different volumes of natural gas.

The volume of underground gas storage needed at a specified depth for a given quantity of natural gas to be stored was calculated and graphed as shown in FIG. 3. In particular, FIG. 3 graphically illustrates estimated variations in required underground gas storage volume with depth for 0.25 BCF, 0.5 BCF, and 1 BCF (STP or zero depth conditions) of total gas storage. As expected, the plotted relationship depends heavily on pressure and temperature gradient assumptions. In particular, in the development of the plotted relationship, realistic temperature and pressure gradients with depth were assumed. In addition, a typical pressure gradient of 0.433 psi/ft was used for the hydrostatic pressure, and the pressure gradient needed to cause rock fracture was estimated to be 0.64 psi/ft. For all calculations, it was assumed that the storage cavern could be pressurized to a value greater than the hydrostatic pressure at depth but less than the pressure needed to cause rock fracture. Thus, a pressure gradient of 0.55 psi/ft was selected for the calculation of this example. However, other pressure gradients could also be used effectively, as is known to those of skill in the art. In addition, a geothermal gradient of 20° C. per kilometer and a surface temperature (3 meters deep) of 11° C. were used to predict cavern temperature.

As can be seen with reference to FIG. 3, the high compressibility of natural gas can make it advantageous in such embodiments to develop caverns with a volume of at least about 1 million cubic feet and at depths greater than about 4000 feet, with one preferred depth at about 6000 feet. Below this depth, the rate of increase in gas density with depth can be greatly reduced, and any advantages gained by the increase in gas density may be offset by higher drilling and operating costs.

The volume of rock that will need to be dissolved in forming the disclosed caverns was also estimated for the particular embodiment wherein the caverns are utilized for natural gas storage. The estimated volume will be a function of the volume of gas to be stored in the cavern (at STP conditions), the gas density at depth, and the carbonate rock formation. The relationship can be characterized by:

$$V_{rock}(\text{ft}^3) = \left[\frac{V_{gas}(STP, \text{ft}^3)\rho_{gas}(\text{depth}, \text{lb/ft}^3)}{\rho_{gas}(STP, \text{lb/ft}^3)}\right]\left(1 - \frac{\% \: RockPorosity}{100}\right)$$

Figure 4:
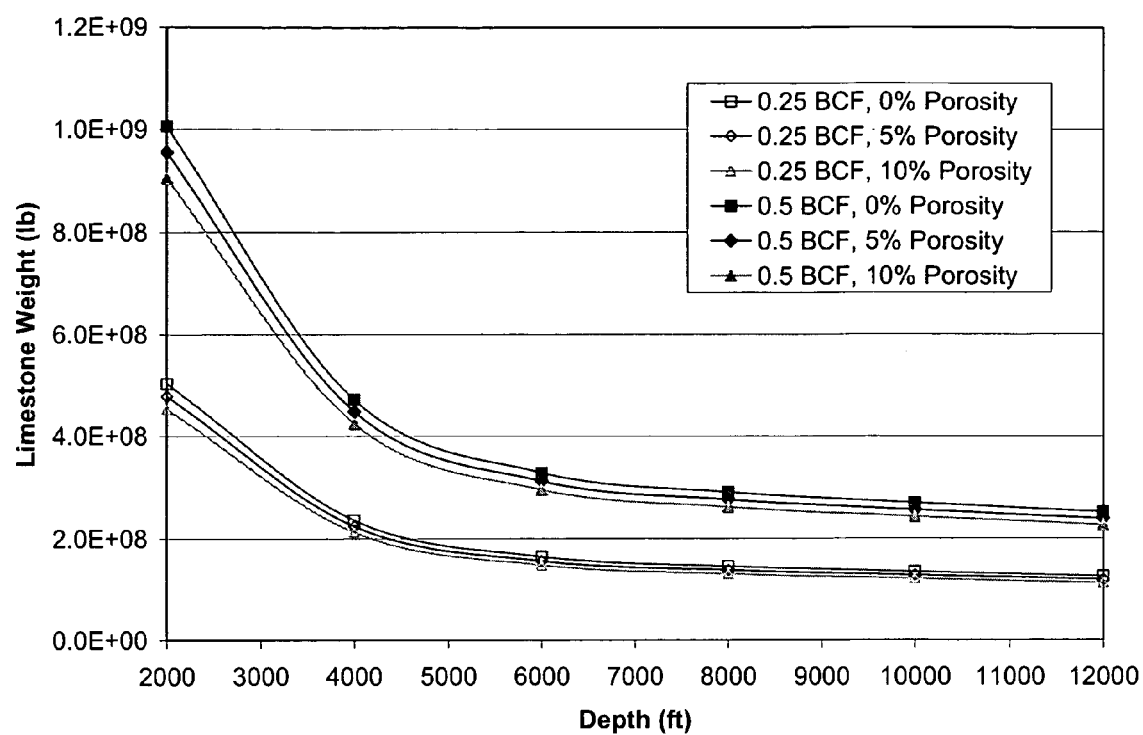
FIG. 4 graphically illustrates the estimated weight of limestone (at various limestone porosities) to be removed at increasing depth for two different gas storage volumes.

The mass of rock that must be removed for a given storage capacity is simply the volume of rock (accounting for the rock porosity) multiplied by the density of the rock. Assuming a calcium carbonate density of approximately 170 lb/ft$^3$, FIG. 4 illustrates how the mass of the rock to be dissolved is estimated to vary with depth, rock porosity, and total gas storage volume of the exemplary cavern.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined herein and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A method for manufacturing an underground cavern comprising:
   drilling a first well into a subterranean formation comprising carbonate rock;
   pumping a low viscosity aqueous acid solution through the first well;
   ejecting the aqueous acid solution from the first well to contact carbonate rock of the formation;
   reacting the aqueous acid with the carbonate rock to form reaction products comprising salt in an aqueous solution and carbonic acid, wherein the carbonic acid is in equilibrium with carbon dioxide; and
   removing the reaction products from the subterranean formation to form a cavern defined by the remaining subterranean formation.

2. The method of claim 1, wherein the aqueous acid is ejected from the first well at multiple locations along the length of the first well.

3. The method of claim 2, wherein the aqueous acid is simultaneously ejected from the multiple locations.

4. The method of claim 1, wherein the carbon dioxide is supercritical carbon dioxide.

5. The method of claim 4, further comprising maintaining a volume of the supercritical carbon dioxide within the subterranean formation over the course of the manufacturing method.

6. The method of claim 1, wherein the reaction products are removed from the subterranean formation through the first well.

7. The method of claim 1, further comprising drilling a second well into the subterranean formation.

8. The method of claim 7, wherein the reaction products are removed from the subterranean formation through the second well.

9. The method of claim 7, further comprising pumping the low viscosity aqueous acid solution through the second well and ejecting the aqueous acid solution from the second well to contact carbonate rock of the formation.

10. The method of claim 1, wherein the acid is an inorganic acid.

11. The method of claim 10, wherein the acid is hydrochloric acid.

12. The method of claim 11, wherein the salt is calcium chloride, the method further comprising isolating the calcium chloride following removal of the reaction products from the subterranean formation.

13. The method of claim 1, further comprising fracturing the subterranean formation prior to pumping the low viscosity aqueous acid solution through the first well.

14. The method of claim 1, further comprising conveying a portion of the reaction products to a constructed wetlands treatment area.

15. A method of forming calcium chloride comprising:
    drilling a well into a subterranean formation comprising carbonate rock;
    pumping a low viscosity aqueous hydrochloric acid solution through the well;
    ejecting the hydrochloric acid solution from the well to contact carbonate rock of the formation;
    reacting the hydrochloric acid with the carbonate rock to form reaction products comprising calcium chloride in an aqueous solution; and
    removing the calcium chloride in aqueous solution from the subterranean formation.

16. The method of claim 15, further comprising isolating the calcium chloride following removal of the calcium chloride from the subterranean formation.

17. The method of claim 16, further comprising conveying the calcium chloride solution to a multiple-effect evaporator for isolating the calcium chloride.

18. A manufactured cavern consisting essentially of a single open void defined by a subterranean formation comprising at least about 70% carbonate rock, wherein the manufactured cavern is at a predetermined depth and the single open void has been manufactured within the carbonate rock formation by acid dissolution of carbonate rock of the formation, the cavern comprising a fabricated access between the cavern and the surface of the earth.

19. The manufactured cavern of claim 18, wherein the cavern is at a predetermined depth of less than about 200 feet.

20. The manufactured cavern of claim 19, wherein the fabricated access provides direct access to the cavern by people.

21. The manufactured cavern of claim 18, wherein the cavern is at a predetermined depth of between about 1000 feet and about 9000 feet.

22. The manufactured cavern of claim 21, wherein the cavern is at a predetermined depth of between about 4000 feet and about 6000 feet.

23. The manufactured cavern of claim 18, wherein the single open void defines a volume of greater than about 1 million cubic feet.

24. The manufactured cavern of claim 18, wherein the single open void defines a volume between about 1 million cubic feet and about 8 million cubic feet.

25. A method for storing a fluid comprising:
   drilling a well to a predetermined depth into a subterranean formation comprising carbonate rock;
   pumping a low viscosity aqueous acid solution through the well;
   ejecting the aqueous acid solution from the well to contact carbonate rock of the formation;
   reacting the aqueous acid with the carbonate rock to form reaction products comprising salt in an aqueous solution and carbonic acid;
   removing the reaction products from the subterranean formation to form a cavern defined by the remaining subterranean formation;
   pumping a fluid into the cavern; and
   storing an amount of the fluid in the cavern.

26. The method of claim 25, wherein the fluid is natural gas.

27. The method of claim 26, wherein the predetermined depth is between about 1000 and about 9000 feet.

28. The method of claim 26, further comprising removing at least a portion of the fluid from the cavern.

29. The method of claim 28, further comprising replacing the removed portion of fluid with a liquid simultaneous with the removal of the fluid.

30. The method of claim 26, wherein the amount of natural gas stored in the cavern is at least about 0.1 billion cubic feet of natural gas as measured at standard temperature and pressure or zero depth conditions.

31. The method of claim 25, wherein the fluid is a liquid at standard temperature and pressure.

32. The method of claim 25, wherein the fluid is a hazardous waste fluid.

33. The method of claim 25, wherein the fluid is compressed air.

34. The method of claim 33, further comprising transforming the energy stored in the compressed air to electrical energy.

35. The method of claim 33, further comprising transforming the energy stored in the compressed air to mechanical energy.

* * * * *